A. J. DOOLITTLE.
PRUNING SHEARS.

No. 62,737. Patented Mar. 12, 1867.

Witnesses:

Inventor:
A. J. Doolittle
By his Attorney

United States Patent Office.

A. J. DOOLITTLE, OF HAMDEN, CONNECTICUT.

Letters Patent No. 62,737, dated March 12, 1867.

---

IMPROVEMENT IN PRUNING-SHEARS.

---

The Schedule referred to in these Letters Patent and making part of the same.

---

TO ALL WHOM IT MAY CONCERN:

Be it known that I, A. J. DOOLITTLE, of Hamden, in the county of New Haven, and State of Connecticut, have invented a new Improvement in Pruning-Shears; and I do hereby declare the following, when taken in connection with the accompanying drawings and the letters of reference marked thereon, to be a full, clear, and exact description of the same, and which said drawings constitute part of this specification, and represent, in—

Figure 1:
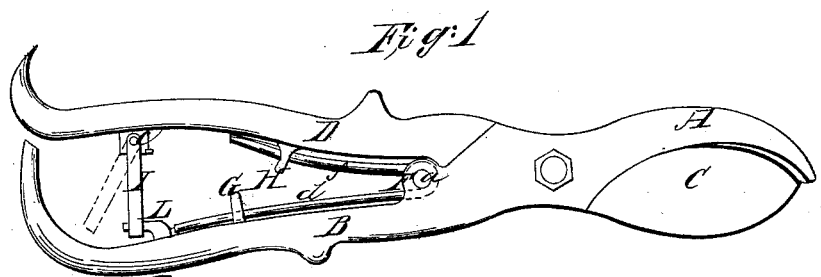

Figure 1, a side view closed, and in

Figure 2:
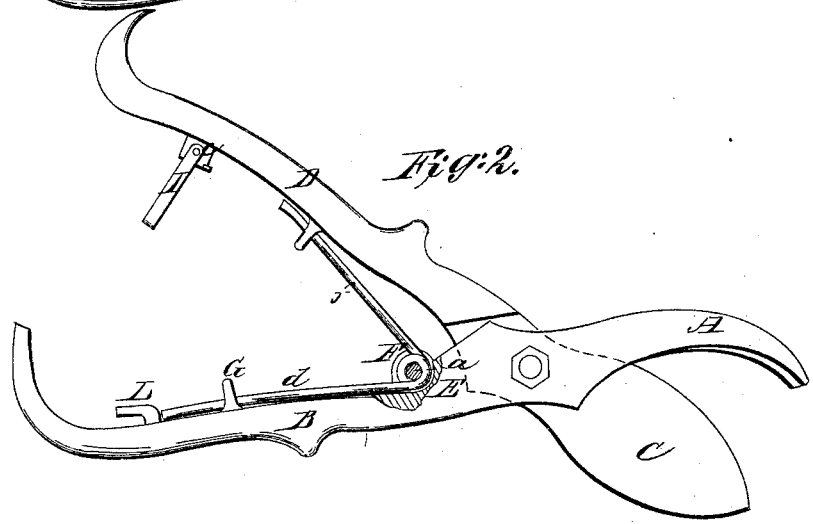

Figure 2, a side view open.

This invention relates to and consists in a peculiar arrangement of the spring which opens the blades, also in a device for securing the blades in a closed position.

To enable others to construct my improvement, I will proceed to describe the same as illustrated in the accompanying drawings.

A is the one blade formed upon a handle, B, C the other blade formed upon a handle, D. In one of the handles B I form a recess at E, as denoted in section fig. 2, between two ears, F, and into this recess place the coil of a wire spring, as seen in fig. 2, a pivot, $a$, passing through to secure the spring in that position. One leg, $d$, of the spring extends along the handle B, through an eye, G, the other leg $f$, along the other handle D, through an eye, H, so as to be held securely in position, and to throw the handles apart when free, as seen in fig. 2. I is a loop, pivoted at $c$ to one of the handles D. Upon the other handle B is formed a hook, L, over which the loop I, when the handles are closed, will freely pass, as denoted in black, fig. 1, and when turned, as denoted in red, the handles are free for use.

Having thus fully described my invention, what I claim as new and useful, and desire to secure by Letters Patent, is—

1. The arrangement of the double leg coil spring, in the manner described, in combination with the two handles B and D, substantially as and for the purpose specified.

2. The combination of the loop I. upon the one handle, and the hook L upon the other, so as to operate substantially as set forth.

A. J. DOOLITTLE.

Witnesses:
 A. J. TIBBITS,
 JOHN H. SHUMWAY.